US 9,137,742 B1

(12) United States Patent
Zhu et al.

(10) Patent No.: US 9,137,742 B1
(45) Date of Patent: Sep. 15, 2015

(54) SELECTIVE AUTHENTICATION OF USER DEVICES IN WIRELESS COMMUNICATION NETWORKS

(75) Inventors: Lei Zhu, Overland Park, KS (US);
Daniel J. Pope, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 755 days.

(21) Appl. No.: 13/033,446

(22) Filed: Feb. 23, 2011

(51) Int. Cl.
*H04W 48/18* (2009.01)

(52) U.S. Cl.
CPC ..................................... *H04W 48/18* (2013.01)

(58) Field of Classification Search
CPC combination set(s) only.
See application file for complete search history.

(56) References Cited

U.S. PATENT DOCUMENTS

| | | | |
|---|---|---|---|
| 7,466,986 B2 * | 12/2008 | Halcrow et al. ............ | 455/456.2 |
| 7,711,366 B1 | 5/2010 | O'Neil et al. | |
| 7,766,223 B1 * | 8/2010 | Mello et al. ................... | 235/379 |
| 7,853,242 B2 * | 12/2010 | Lewis et al. .................... | 455/411 |
| 7,860,778 B2 * | 12/2010 | Mylet et al. ....................... | 705/37 |
| 8,059,599 B1 * | 11/2011 | Rogers et al. ................. | 370/331 |
| 8,195,190 B1 * | 6/2012 | Hou ........................... | 455/456.1 |
| 8,285,291 B2 * | 10/2012 | Dinan et al. .................. | 455/443 |
| 8,364,114 B2 * | 1/2013 | Li et al. ....................... | 455/404.1 |
| 8,396,039 B2 * | 3/2013 | Pawar et al. .................. | 370/331 |
| 8,538,433 B2 * | 9/2013 | Kekki et al. .................. | 455/436 |
| 8,634,795 B2 * | 1/2014 | Murphy et al. ............... | 455/403 |
| 8,699,450 B2 * | 4/2014 | Chin et al. .................... | 370/331 |
| 8,738,042 B2 * | 5/2014 | Lee et al. .................... | 455/456.6 |
| 8,755,317 B2 * | 6/2014 | Chin et al. .................... | 370/311 |
| 2005/0202823 A1 * | 9/2005 | Shaheen et al. ............... | 455/436 |
| 2006/0034228 A1 * | 2/2006 | Kim et al. ...................... | 370/335 |
| 2006/0083199 A1 | 4/2006 | Yang | |
| 2006/0100951 A1 * | 5/2006 | Mylet et al. ...................... | 705/37 |
| 2006/0221917 A1 * | 10/2006 | McRae .......................... | 370/338 |
| 2006/0276192 A1 | 12/2006 | Dutta et al. | |
| 2007/0224988 A1 | 9/2007 | Shaheen | |
| 2007/0248079 A1 | 10/2007 | Jayaram et al. | |
| 2008/0049673 A1 * | 2/2008 | Park et al. ..................... | 370/331 |
| 2008/0064393 A1 * | 3/2008 | Oommen et al. .......... | 455/432.1 |
| 2008/0090595 A1 * | 4/2008 | Liu et al. ....................... | 455/461 |
| 2008/0101291 A1 * | 5/2008 | Jiang et al. .................... | 370/331 |
| 2009/0109925 A1 * | 4/2009 | Nakamura et al. ............ | 370/331 |
| 2009/0135758 A1 * | 5/2009 | Alper et al. .................... | 370/328 |
| 2009/0225725 A1 | 9/2009 | Zhu | |
| 2009/0279503 A1 * | 11/2009 | Chin et al. .................... | 370/331 |
| 2009/0279504 A1 * | 11/2009 | Chin et al. .................... | 370/331 |
| 2010/0175116 A1 * | 7/2010 | Gum ................................ | 726/6 |
| 2011/0007714 A1 * | 1/2011 | Nagasawa et al. ............ | 370/332 |
| 2011/0047592 A1 * | 2/2011 | Feder et al. ....................... | 726/1 |
| 2011/0189997 A1 * | 8/2011 | Tiwari et al. .................. | 455/443 |
| 2013/0003719 A1 * | 1/2013 | Kamdar et al. ............... | 370/352 |

\* cited by examiner

*Primary Examiner* — Taghi Arani
*Assistant Examiner* — Phy Anh Vu (57) ABSTRACT

What is disclosed is a method of operating a communication system, where a user device receives wireless access for a communication session over a first wireless communication network. The method includes receiving a registration request transferred by the user device for wireless access from a second wireless communication network, and in response to the registration request, processing an authentication status for the communication session of the first wireless communication network to authenticate the communication session in the second wireless communication network.

9 Claims, 5 Drawing Sheets

SELECTIVE AUTHENTICATION OF USER DEVICES IN WIRELESS COMMUNICATION NETWORKS

TECHNICAL FIELD

Aspects of the disclosure are related to the field of communications, and in particular, authenticating user devices in wireless communication networks.

TECHNICAL BACKGROUND

Wireless communication networks typically include access equipment to provide wireless access to communication services for user devices. The access equipment can include base stations, authentication nodes, or other equipment to provide the wireless access. A wireless communication network typically provides coverage for wireless access over a geographic area, such as a metro area. Additionally, multiple wireless communication networks can provide coverage over similar geographic areas, such as the same metro area. The multiple wireless communication networks could each employ different features, communication modes, protocols, or channels.

A user device typically enters into a registration process with access equipment of a wireless communication network when the user device seeks to obtain wireless access from that wireless communication network. However, when the user device transitions to a second wireless communication network, a separate registration process occurs. This can lead to communication delays for the user device during the registration process with the second wireless communication network.

Overview

What is disclosed is a method of operating a communication system, where a user device receives wireless access for a communication session over a first wireless communication network. The method includes receiving a registration request transferred by the user device for wireless access from a second wireless communication network, and in response to the registration request, processing an authentication status for the communication session of the first wireless communication network to authenticate the communication session in the second wireless communication network.

What is also disclosed is a communication system. The communication system includes a first wireless communication network configured to provide wireless access to a user device for a communication session over the first wireless communication network. The communication system also includes a second wireless communication network configured to receive a registration request transferred by the user device for wireless access from the second wireless communication network. In response to the registration request, the second wireless communication network is configured to process an authentication status for the communication session of the first wireless communication network to authenticate the communication session in the second wireless communication network.

What is also disclosed is a method of operating a communication system. The method includes exchanging communications with a user device for a communication session over a first wireless communication network using a first wireless communication mode, and receiving a handover request transferred by the user device for transition of the communication session from the first wireless communication network to a second wireless communication network. In response to the handover request, the method includes determining an authentication status for the communication session of the first wireless communication network, and processing at least a first portion of the authentication status of the first wireless communication network to authenticate the communication session in the second wireless communication network. The method also includes exchanging further communications with the user device for the communication session over the second wireless communication network using a second wireless communication mode.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
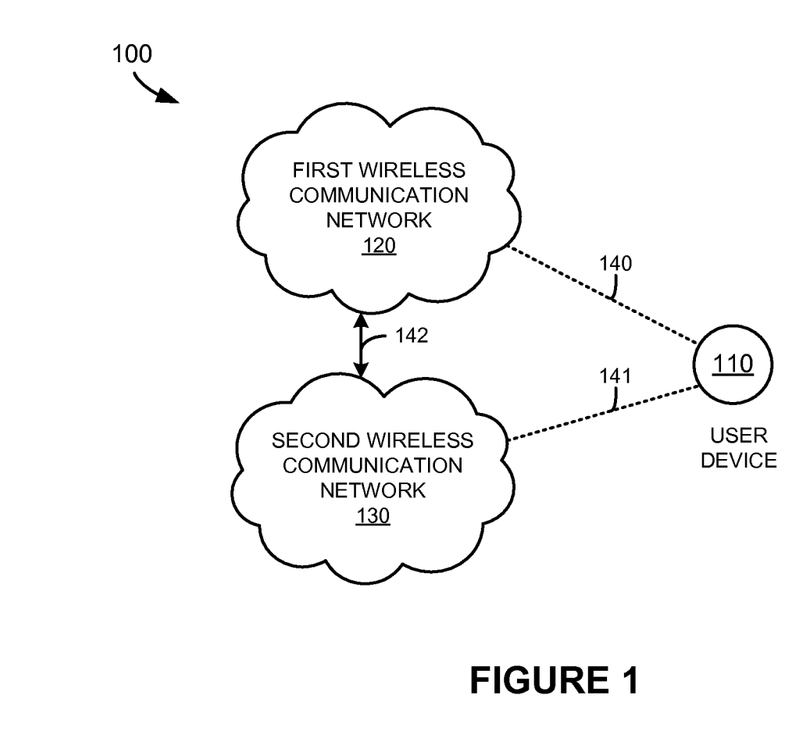
FIG. 1 is a system diagram illustrating a communication system.

FIG. 1 is a system diagram illustrating communication system 100. Communication system 100 includes user device 110, first wireless communication network 120, and second wireless communication network 130. User device 110 and first wireless communication network 120 communicate over wireless link 140. User device 110 and second wireless communication network 130 communicate over wireless link 141. First wireless communication network 120 and second wireless communication network 130 are communicatively coupled over link 142.

In FIG. 1, both first wireless communication network 120 and second wireless communication network 130 can provide wireless access to communication services for user devices, such as voice calls, text messaging, or Internet access, among other services. Initially, user device 110 is engaged in a communication session through first wireless communication network 120, and receives wireless access to communication services through first wireless communication network 120 over wireless link 140. Typically, user device 110 and first wireless communication network 120 enter into a registration or negotiation process to establish the communication session over wireless link 140. During operation, user device 110 may transition to receive wireless access to the communication services through second wireless communication network 130, perhaps due to physical movement of user device 110 into a different geographic area, due to user device 110 requesting a different set of services or feature set than first wireless communication network 120 can provide, or initiating another communication session, among other reasons.

Figure 2:
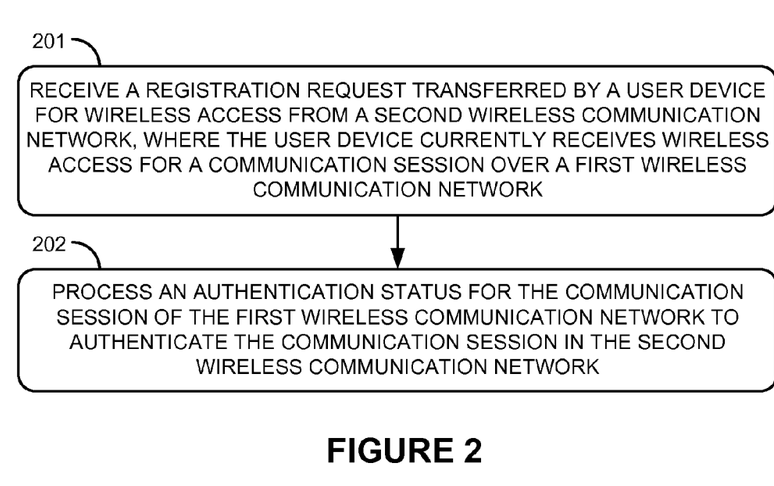
FIG. 2 is a flow diagram illustrating a method of operation of a communication system.

FIG. 2 is a flow diagram illustrating a method of operating communication system 100. The operations of FIG. 2 are referenced herein parenthetically. In FIG. 2, second wireless communication network 130 receives (201) a registration request transferred by user device 110 for wireless access from second wireless communication network 130, where user device 110 currently receives wireless access for a communication session over first wireless communication network 120. As discussed above, to receive wireless access through first wireless communication network 120, user device 110 went through a registration process with first wireless communication network 120, which could include authentication, authorization, or other processes to enable user device 110 to establish a communication session through first wireless communication network 120. A similar registration process could begin between user device 110 and second wireless communication network 130 in response to the registration request received in second wireless communication network 130.

Second wireless communication network 130 processes (202) an authentication status for the communication session of first wireless communication network 120 to authenticate the communication session in second wireless communication network 130. In some examples, responsive to the registration request, second wireless communication network 130 requests the authentication status from first wireless communication network 120. In other examples, the authentication status is pushed to second wireless communication network 130 by first wireless communication network responsive to user device 110 transitioning from wireless access through first wireless communication network 120 to second wireless communication network 130. The authentication status could include device authentication information, user authentication information, or network authentication information, among other authentication or authorization information for user device 110. The authentication status for the communication session between first wireless communication network 120 and user device 110 could be stored within equipment or systems of first wireless communication system 120. In this example, the authentication status is exchanged between first wireless communication network 120 and second wireless communication network 130 over link 142.

Figure 3:
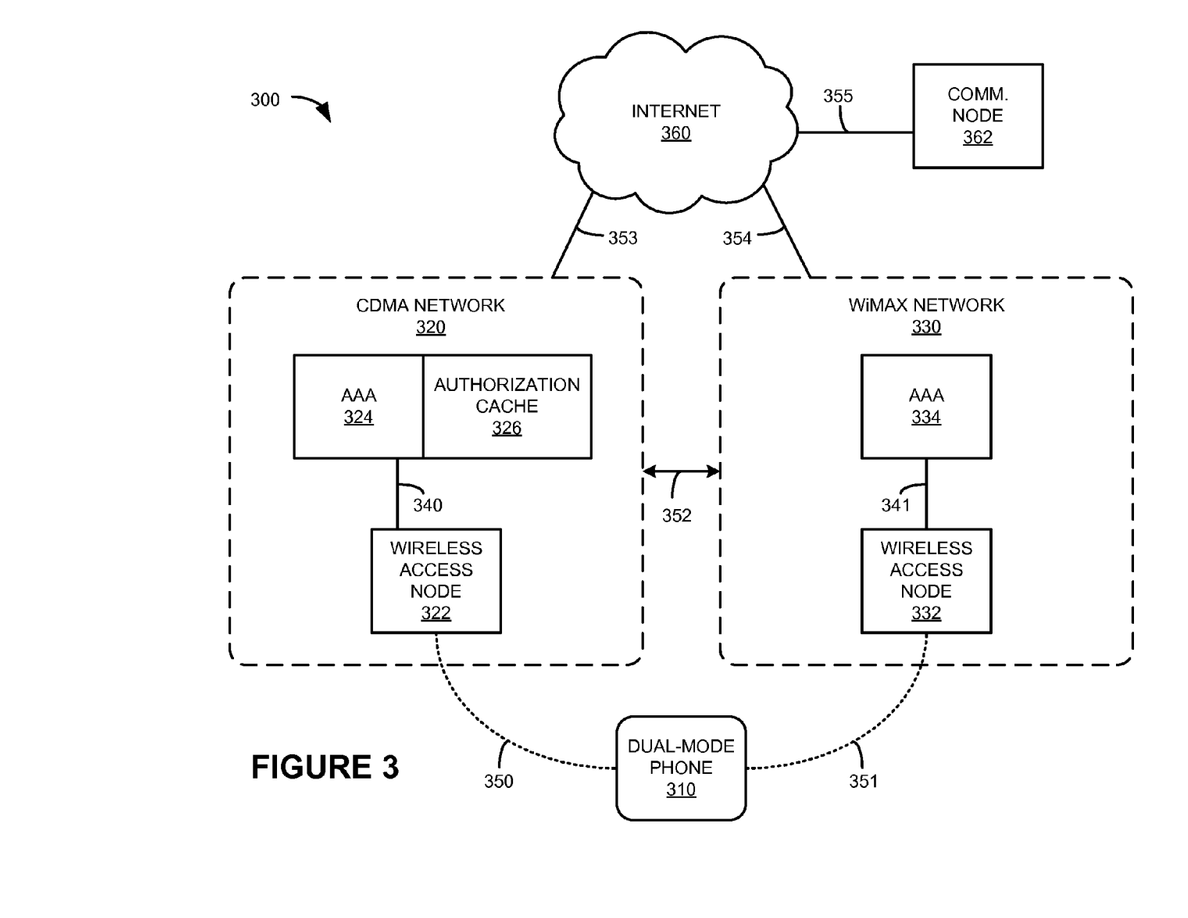
FIG. 3 is a system diagram illustrating a communication system.

FIG. 3 is a system diagram illustrating communication system 300. Communication system 300 includes dual-mode phone 310, Code Division Multiple Access (CDMA) network 320, Worldwide Interoperability for Microwave Access (WiMAX) network 330, Internet 360, and communication node 362. Phone 310 and CDMA network 320 can communicate over wireless link 350, which is a CDMA wireless link in this example. Phone 310 and WiMAX network 330 can communicate over link 351, which is a WiMAX wireless link in this example. CDMA network 320 and WiMAX network 330 communicate over link 352, which is a metropolitan area networking link capable of carrying packet communications. CDMA network 320 and Internet 360 communicate over link 353, which is an optical networking link capable of carrying Internet protocol (IP) traffic. WiMAX network 330 and Internet 360 communicate over link 354, which is an optical networking link capable of carrying Internet protocol (IP) traffic. Internet 360 and communication node 362 communicate over IP link 355.

Dual-mode phone 310 is a user device, comprising a wireless mobile phone in this example, and is capable of communicating in at least two different wireless communication modes, namely the CDMA and WiMAX communication modes. In this example, wireless link 350 and wireless link 351 employ different wireless communication modes or wireless communication protocols. It should be understood that other wireless protocols or wireless access network technologies could be employed. It should also be understood that in this example, dual-mode phone 310 represents a user device that can provide voice and/or data services over wireless links.

CDMA network 320 is a wireless network of a wireless communication provider, such as a wireless phone and data service provider. CDMA network 320 includes wireless access node 322, authentication, authorization and accounting (AAA) system 324, and authorization cache 326. Wireless access node 322 includes equipment and systems to provide wireless access to communication services for user devices within a coverage area. Wireless access node 322 could comprise a base station or a base transceiver stations (BTS), and could include transceiver and antenna circuitry. Wireless access node 322 and AAA 324 communicate over link 340, which is an Ethernet link in this example. It should be understood that other communication equipment could be communicatively positioned between wireless access node 322 and AAA 324, such as routers, base station controllers (BSC), mobile switching centers (MSC), radio network controllers (RNC), or other communication equipment.

AAA 324 includes computer processing equipment for authenticating and authorizing user devices for various wireless access features of CDMA network 320, as well as equipment to determine accounting information for user devices, such as billing, metering, time-based usage, or other user device account monitoring information. AAA 324 also includes equipment to store and retrieve authentication status information in authorization cache 326. Authorization cache 326 includes equipment such as processing systems, communication interfaces, computer-readable storage media, and other equipment to store and transfer authentication status information for user devices. In some examples, authorization cache 326 is located within the same equipment as AAA 324, wireless access node 322, or other equipment of CDMA network 320. Authorization cache 326 includes a computer-readable medium such as a disk, tape, integrated circuit, server, or some other memory device, and also may be distributed among multiple memory devices. Authorization cache 326 may comprise an operating system, logs, utilities, drivers, networking software, firmware, and other software typically loaded onto a computer system. It should be understood that the authentication status information could be referred to as authorization status information in some examples.

Although not shown in FIG. 3 for clarity, CDMA network 320 could also include further wireless access nodes, radio network controllers (RNC), base station controllers (BSC), mobile switching centers (MSC), home location registers (HLR), packet data switching nodes (PDSN), home agents (HA), mobility access gateways (MAG), Internet access nodes, call processing systems, telephony service nodes, wireless data access points, routers, databases, or other communication and control equipment.

WiMAX network 330 is also a wireless network of a wireless communication provider, such as a wireless phone and data service provider. WiMAX network 330 could be a wireless network of the same or of a different wireless phone and data service provider than CDMA network 320. WiMAX network 330 includes wireless access node 332 and authentication, authorization and accounting (AAA) system 334. Wireless access node 332 and AAA 334 communicate over Ethernet link 341 in this example. It should be understood that other communication equipment could be communicatively positioned between wireless access node 332 and AAA 334, such as routers, wireless access node controllers, or other communication equipment.

AAA 334 includes computer processing equipment for authenticating and authorizing user devices for various wireless access features of WiMAX network 330, as well as equipment to determine accounting information for user devices, such as billing, metering, time-based usage, or other user device account monitoring information. In further examples, WiMAX network 330 also includes an authorization cache as found in CDMA network 320. In typical examples, AAA 334 retrieves dual-mode phone 310 authentication status data from authorization cache 326 and transfers the authentication status data for storage in elements of WiMAX network 330, such as a WiMAX authorization cache.

Although not shown in FIG. 3 for clarity, WiMAX network 330 could also include further wireless access nodes, wireless access node controllers, mobile switching centers (MSC), access service network gateways (ASN-GW), home agents (HA), mobility access gateways (MAG), Internet access nodes, call processing systems, telephony service nodes, wireless data access points, routers, databases, authorization caches, or other communication and control equipment.

Internet 360 includes equipment and systems to route packet communications between endpoints using the Internet protocol (IP). Internet 360 could comprise routers, switches, gateways, bridges, as well as various network links. Communication node 362 exemplifies a communication endpoint for phone 310 to communicate with, such as an endpoint node for a communication session. Communication node 362 communicates over Internet 360 and link 355 with other communication nodes, such as user devices. Examples of communication node 362 include video servers, media storage systems, data servers, computers, processing systems, storage-area networks, web servers, application servers, network-attached storage systems, or other equipment, including combinations thereof. In further examples, communication node 362 comprises a user device, such as discussed herein for phone 310 or user device 110.

Figure 4:
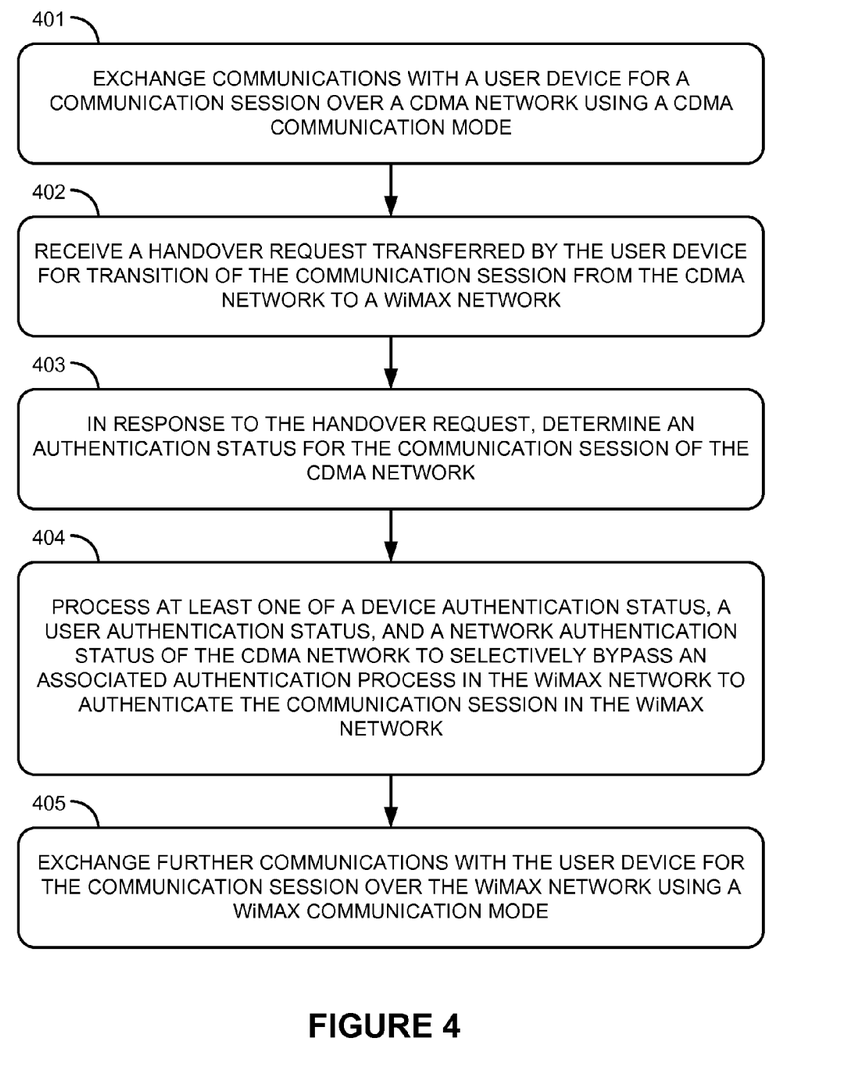
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, CDMA network 320 exchanges (401) communications with phone 310 for a communication session over CDMA network 320 using a CDMA communication mode. In FIG. 3, CDMA network 320 can provide wireless access to communication services for user devices, such as voice calls, text messaging, or Internet access, among other services. Initially, phone 310 is engaged in a communication session through CDMA network 320, and receives wireless access to communication services through CDMA network 320 over wireless link 350. In this example, phone 310 and communication node 362 are engaged in the communication session over CDMA network 320 and Internet 360. The communication session could comprise an IP application session, such as a video stream, voice call, video conference, data transfer, web site access, virtual private network (VPN) access, or other IP application session.

Typically, phone 310 and CDMA network 320 first enter into a registration or negotiation process to establish the communication session over wireless link 350. As a part of the registration process between phone 310 and CDMA network 320, AAA 324 performs various levels of authentication or authorization. The various authentication levels could include device authentication, user authentication, and network authentication, among other authentication and authorization processes. Device authentication includes authorizing the physical equipment of phone 310 itself, such as authenticating a device identity, device type, device identification number, device network access identifier (device NAI), electronic serial number (ESN), International Mobile Subscriber Identity (IMSI), subscriber identity module (SIM), phone number, hardware code, or other identifier associated with a device, such as with phone 310. User authentication includes authorizing the user of phone 310, such as authenticating a user identity, checking billing records or accounting information, authenticating personal identifiers, user network access identifier (user NAI), passwords, biometrics, or other information to ensure the user of phone 310 is authorized to access CDMA network 320 through phone 310. Network authentication includes determining if phone 310 or a user can access network routing features of CDMA network 320, such as obtaining a network or IP address, gaining access through a network gateway or home agent (HA) of CDMA network 320 to Internet 360, among other network features. In this example, the network authentication comprises an IP authentication status.

In FIG. 3, similar to CDMA network 320, WiMAX network 330 can also provide wireless access to communication services for user devices, such as voice calls, text messaging, or Internet access, among other services. As discussed above, phone 310 is initially engaged in a communication session with communication node 362 through CDMA network 320, and receives wireless access to communication services through CDMA network 320 over wireless link 350. During the communication session, phone 310 transitions to receive wireless access through WiMAX network 330 instead of CDMA network 320, perhaps due to physical movement of phone 310 into a different geographic area, due to phone 310 requesting a different set of services or feature set than CDMA network 320 can provide, due to wireless coverage limitations of CDMA network 320, or due to phone 310 initiating another communication session, among other reasons. As with CDMA network 320, phone 310 and WiMAX network 330 typically enter into a registration or negotiation process to establish wireless access over wireless link 351.

WiMAX network 330 receives (402) a handover request transferred by phone 310 for transition of the communication session from CDMA network 320 to WiMAX network 330. The handover request could comprise a network access request triggered from a handover from CDMA network 320, such as a request to handoff from wireless access node 322 to wireless access node 332. In some examples, the handover request is transferred by phone 310 over wireless link 350 to CDMA network 320, while in other examples, the handover request is transferred by phone 310 over wireless link 351 to WiMAX network 330. In further examples, CDMA network 320 transfers the handover request to WiMAX network 330 over link 352. In yet further examples, the handover request could be generated by CDMA network 320 due to activity of phone 310, such as movement through wireless coverage areas, phone 310 requesting communication services not offered by CDMA network 320, or due to congestion of CDMA network 320 prompting CDMA network 320 to desire to transition phone 310 to another wireless communication network. Other examples of handover requests or handover notices could be employed. In some examples, the handover request or handover notice includes identifying information for phone 310, such as phone number, session keys, NAI, ESN, or IMSI, application session identifier, or an IP address for the present communication session, among other identifiers for WiMAX network 330 to identify phone 310 when requesting information from CDMA network 320. In other examples, the handover request or handover notice includes information about CDMA network 320, such as technology employed over CDMA network 320.

In response to the handover request, WiMAX network 330 determines (403) an authentication status for the communication session of CDMA network 320. CDMA network 320 stores authentication status information for phone 310 in authorization cache 326 in this example. Authorization cache 326 could comprise a database containing present authorization states for various user devices communicating with CDMA network 320. Requests for an authentication status for a particular user device, such as phone 310, could be received over link 352 into CDMA network 320, and processed by AAA 324 or authorization cache 326 to determine responses to the requests. WiMAX network 330 could request all information from CDMA network 320 regarding the authentication status of phone 310, or could request only portions thereof. CDMA network 320 then transfers the requested authentication status for delivery to WiMAX network 330. Although in this example, link 352 is shown directly between CDMA network 320 and WiMAX network 330, it should be understood that link 352 could be a logical or virtual link, and communications thereon could be transported over links 353-354 and Internet 360, among other examples. Link 352 could employ the Extensible Authentication Protocol (EAP). The authentication status could include a tabular data format indicating the status of the various levels of authentication for phone 310, such as physical device authentication status, user authentication status, or network authentication status, among other status information and formats.

Similar to CDMA network 320, as a part of the registration process between phone 310 and WiMAX network 330, AAA 334 performs various levels of authentication or authorization. The various authentication levels could include device authentication, user authentication, and network authentication, among other authentication and authorization processes. However, WiMAX network 330 processes (404) at least one of a device authentication status, a user authentication status, and a network authentication status of CDMA network 320 to selectively bypass an associated authentication process in WiMAX network 330 to authenticate the communication session in WiMAX network 330. The particular authentication status which is bypassed could be selected based upon various factors. In some examples, these factors include a traffic level, congestion level, or processor utilization level of authorization equipment of WiMAX network 330, such as of AAA 334. In other examples, these factors include a communication session type or application type of the present communication session between phone 310 and communication node 362. In further examples, these factors include a technology type, such as a wireless communication mode type or wireless communication protocol type, of CDMA network 320 or wireless link 350. In yet further examples, these factors include a user payment history, such as on what level a user of phone 310 complied with a monthly bill payment in a past time period, such as a month or a calendar year. The payment history could be determined from tabular data of the authentication status or from another source, such as a billing status received from a billing or accounting system. Registration communications between phone 310 and WiMAX network 330 could be omitted, ignored, or immediately replied to without authentication by WiMAX network 330 during the selective bypass process.

During heavy traffic periods, delays may be incurred by proceeding through a complete authentication and authorization process for phone 310 in WiMAX network 330. This can lead to communication delays for the communication sessions of phone 310, latencies in the transfer of communications between communication node 362 and phone 310, or to increased loading on the authentication and authorization systems of WiMAX network 330, among other delays and latencies. In some examples, WiMAX network 330 processes an activity level of authorization equipment, such as AAA 334, of WiMAX network 330 to determine which associated authentication process in WiMAX network 330 is to be bypassed. The activity level of the authorization equipment could comprise a registration drop rate, a registration incomplete rate, and a processor utilization level or the authorization equipment, among other activity levels. Registration drop rates include communication sessions of user devices which are dropped or unexpectedly terminated, registration incomplete rates typically include when a registration process does not complete for user devices, and a processor utilization level typically includes a number of busy cycles of a central processing unit (CPU) of authorization equipment. Other activity levels could be considered, such as an amount of user devices receiving wireless access through WiMAX network 330, a utilization level of wireless access node 332, or other activity levels.

In some examples, different levels of activity of the authorization equipment of WiMAX network 330 could correspond to different bypassed authentication levels. For example, a physical device authentication could be bypassed at a first activity level of AAA 334, physical device authentication and user authentication could be bypassed at a second activity level of AAA 334, and physical device authentication, user authentication, and IP authentication could be bypassed at a third activity level of AAA 334. Other examples corresponding different activity levels to authentication bypasses could be employed. The various activity levels could be represented by different thresholds.

In other examples, the technology employed by CDMA network 320 is processed to determine which authentication level to bypass. For example, if the wireless technology employed by CDMA network 320 is different than WiMAX network 330, then certain authentication levels could be bypassed. As a further example, an IP authentication process could be bypassed in WiMAX network 330, while still authenticating the physical device and the user in WiMAX network 330. Other variations on selective authentication based on the different technologies employed by in CDMA network 320 and WiMAX network 330 could be used.

In further examples, such as when the network authentication status comprises an IP authentication status, the authorization equipment of WiMAX network 330 comprises AAA 334 for the device authentication status and the user authentication status, and home agent (HA) equipment for the IP authentication status. IP authentication status or the present IP address associated with the present communication session could be transferred to the HA from CDMA network 320, while other authentication information could be transferred to AAA 334. In yet further examples, in response to WiMAX network 330 receiving the authentication status, or authenticating the communication session in WiMAX network 330, CDMA network 320 could clear the cached authentication status in authorization cache 326 for the communication session. WiMAX network 330 could transfer an acknowledge message to CDMA network 320 to indicate that the authentication status for phone 310 was received, or that phone 310 was authenticated properly in WiMAX network 330.

WiMAX network 330 exchanges (405) further communications with phone 310 for the communication session over WiMAX network 330 using the WiMAX communication mode. In this example, phone 310 and wireless access node 332 communicate over wireless link 351. In some examples, WiMAX network 330 maintains the same communication session between phone 310 and communication node 362 for the further communications. Maintaining the same communications session could include maintaining a common IP address for phone 310 throughout the transition from CDMA network 320 to WiMAX network 330 and from wireless link 350 to wireless link 351. Maintaining the same communications session could also include maintaining other features of the communication session, such as an application session with communication node 362, or maintaining common billing or metering information and timers. In other examples, a new communication session is initiated, and the communication session between phone 310 and communication node 362 is not maintained.

Although the example presented in FIG. 4 discusses a transition of phone 310 from CDMA network 320 to WiMAX network 330, it should be understood that similar principles apply to transitions of user devices from WiMAX network 330 to CDMA network 320. Also, it should be understood that other wireless technologies, protocols, and modes could be employed, as discussed herein for wireless links 140-141 and wireless links 350-351.

Figure 5:
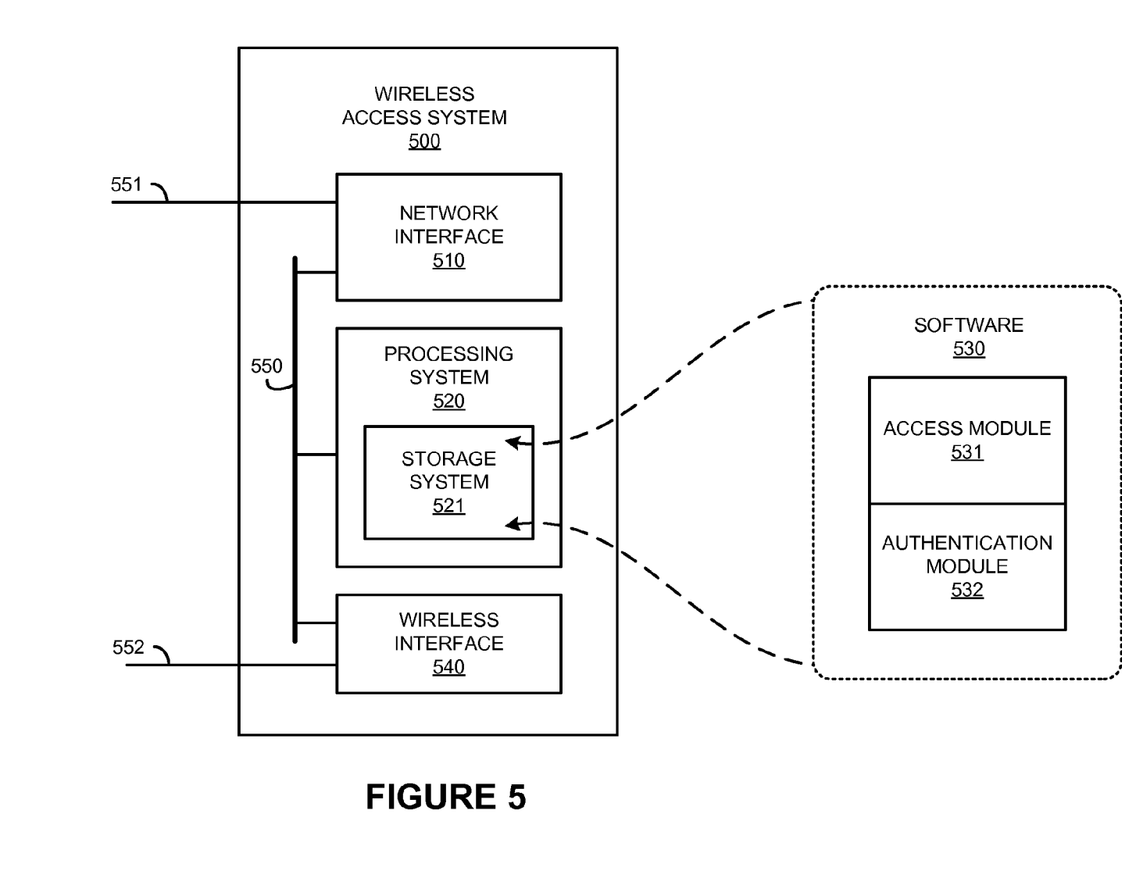
FIG. 5 is a block diagram illustrating a wireless access node.

FIG. 5 is a block diagram illustrating wireless access system 500, as an example of first wireless communication network 120 or second wireless communication network 130 found in FIG. 1, or CDMA network 320 or WiMAX network 330 found in FIG. 3, although wireless first wireless communication network 120, second wireless communication network 130, CDMA network 320, or WiMAX network 330 could use other configurations. Wireless access system 500 includes network interface 510, processing system 520, and wireless interface 540. Network interface 510, processing system 520, and wireless interface 540 are shown to communicate over a common bus 550 for illustrative purposes. It should be understood that discrete links could be employed, such as network links. Wireless access system 500 may be distributed among multiple devices that together form elements 510, 520-521, 530-532, 540, and 550-552.

Network interface 510 comprises network router and gateway equipment for communicating with wireless communication provider equipment, such as with a wireless communication networks, or with core networks, the Internet, or other communication systems. Network interface 510 exchanges user communications and overhead communications over link 551. Link 551 could use various protocols or communication formats as described herein for links 142, 340-341, or 352-355, including combinations, variations, or improvements thereof.

Processing system 520 includes storage system 521. Processing system 520 retrieves and executes software 530 from storage system 521. In some examples, processing system 520 is located within the same equipment in which network interface 510 or wireless interface 540 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as receive registration requests, establish wireless links with user devices, authenticate or authorize user devices, communication sessions, or users, and instruct wireless interface 540 to exchange wireless communications with wireless communication devices, among other operations.

In this example, software 530 includes access module 531 and authentication module 532. It should be understood that a different configuration could be employed, and individual modules of software 530 could be included in different equipment than wireless access system 500. Access module 531 receives registration requests transferred by user devices seeking wireless access to communication services for communication sessions. Access module 531 communicates with authentication module 532 to authorize or authenticate user devices, users, or communication sessions. Once authorized or authenticated, access module 531 provides wireless access to communication services for the associated user devices. Access module 531 could control the operations of wireless interface 540 for providing the wireless access. Authentication module 532 authenticates and/or authorizes user devices, users, and communication sessions, among others, for access to communication services through wireless access system 500. Authentication module 532 can exchange authentication and authorization information with other wireless access systems, wireless communication networks, or other entities associated therewith.

Wireless interface 540 comprises communication interfaces for communicating with wireless communication devices, such as user devices. Wireless interface 540 could include transceiver equipment and antenna elements for wirelessly exchanging user communications and overhead communications with user devices, omitted for clarity, over the associated wireless link 552. Wireless interface 540 also receives command and control information and instructions from processing system 520 or network interface 510 for controlling the operations of user devices over wireless link 552, coordinating handoffs of user devices between base stations or other wireless access systems, exchanging authentication or authorization information with other wireless communication networks, and transferring communications for delivery to user devices. Wireless link 552 could use various protocols or communication formats as described herein for wireless links 140-141 or 350-351, including combinations, variations, or improvements thereof.

Bus 550 comprises a physical, logical, or virtual communication link, capable of communicating data, control signals, and communications, along with other information. In some examples, bus 550 is encapsulated within the elements of network interface 510, processing system 520, or wireless interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Referring back to FIG. 1, user device 110 comprises transceiver circuitry and communication elements. The transceiver circuitry typically includes amplifiers, filters, modulators, and signal processing circuitry. User device 110 may also include user interface systems, memory devices, computer-readable storage mediums, software, processing circuitry, or some other communication components. User device 110 may be a wireless communication device, subscriber equipment, customer equipment, access terminal, telephone, mobile wireless telephone, personal digital assistant (PDA), computer, e-book, mobile Internet appliance, wireless network interface card, media player, game console, or some other wireless communication apparatus, including combinations thereof. Although one user devices is shown in FIG. 1, it should be understood that a different number of user devices could be shown. User device 110 could include multiple transceiver portions or antenna portions, among other circuit and equipment elements, for communicating wirelessly with multiple wireless communication networks, using different wireless communication modes or wireless communication protocols. For example, user device 110 could be a dual-mode phone capable of communicating with first wireless communication network 120 and second wireless communication network 130.

First wireless communication network 120 comprises communication and control systems for providing access to communication services for user devices. In some examples, first wireless communication network 120 includes equipment to provide wireless access to communication services within different coverage areas to user devices, route communications between content providers and user devices, and receive registration and content requests, among other operations. First wireless communication network 120 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Second wireless communication network 130 comprises communication and control systems for providing access to communication services for user devices. In some examples, second wireless communication network 130 includes equipment to provide wireless access to communication services within different coverage areas to user devices, route communications between content providers and user devices, and receive registration and content requests, among other operations. Second wireless communication network 130 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Communication link 142 uses metal, glass, optical, air, space, or some other material as the transport media. Communication link 142 could use various communication protocols, such as Time Division Multiplex (TDM), asynchronous transfer mode (ATM), Internet Protocol (IP), Ethernet, synchronous optical networking (SONET), circuit-switched, communication signaling, wireless communications, or some other communication format, including combinations, improvements, or variations thereof. Communication link 142 could be a direct link or may include intermediate networks, systems, or devices, and could include a logical network link transported over multiple physical links.

Wireless links 140-141 each use the air or space as the transport media. Wireless links 140-141 may each use various protocols, such as Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 140-141 are shown in FIG. 1, it should be understood that wireless links 140-141 are merely illustrative to show communication modes or wireless access pathway for user device 110. In other examples, further wireless links could be shown, with portions of the further wireless links shared and used for different communication sessions and associated paging or overhead communications.

Communication links 140-142 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:

receiving wireless access for a communication session over a Code Division Multiple Access (CDMA) wireless communication network;

receiving a registration request transferred by a user device for wireless access from another wireless communication network, different from the CDMA wireless communication network;

receiving authentication information for the communication session from Authentication, Authorization, and Accounting (AAA) equipment in the CDMA wireless communication network over the CDMA wireless communication network; wherein the authentication information comprises at least one of user device authentication information, user authentication information, or network authentication information;

in response to the registration request, processing the authentication information for the communication session over the CDMA wireless communication network to selectively bypass an associated authentication process in the other wireless communication network to authenticate the communication session in the other wireless communication network, wherein the other wireless communication network comprises one of: a Long Term Evolution (LTE) wireless communication network or a Worldwide Interoperability for Microwave Access (WiMAX) wireless communication network;

processing an activity level of AAA equipment in the other wireless communication network to select the associated authentication process in the other wireless communication network to bypass, wherein the activity level of the AAA equipment in the other wireless communication network comprises at least one of a registration drop rate, a registration incomplete rate, and a processor utilization level.

2. The method of claim 1, wherein the network authentication information comprises Internet protocol (IP) authentication information; and
wherein the AAA equipment in the other wireless communication network comprises home agent (HA) equipment.

3. The method of claim 1, wherein processing the authentication information for the communication session over the CDMA wireless communication network comprises checking an authorization cache of the CDMA wireless communication network.

4. The method of claim 3, further comprising:
in response to successfully authenticating the communication session in the other wireless communication network, clearing the authorization cache of the CDMA wireless communication network.

5. The method of claim 1, further comprising:
exchanging communications with the user device for the communication session over the CDMA wireless communication network using a CDMA wireless communication mode; and
exchanging further communications with the user device for the communication session over the other wireless communication network using another wireless communication mode.

6. The method of claim 5, wherein exchanging further communications with the user device for the communication session over the other wireless communication network using the other wireless communication mode comprises maintaining the same communication session for the communications over the CDMA wireless communication network and the further communications over the other wireless communication network.

7. The method of claim 5, wherein the user device comprises a multi-mode wireless communication device, wherein a first mode of the multi-mode wireless communication device comprises the CDMA wireless communication mode, and wherein a second mode of the multi-mode wireless communication device comprises the other wireless communication mode.

8. A communication system, comprising:
a processor; and
a memory, wherein the memory stores computer executable instructions that when executed by the processor, cause the processor to perform a method comprising:
receiving wireless access for a communication session over a Code Division Multiple Access (CDMA) wireless communication network;
receiving a registration request transferred by a user device for wireless access from another wireless communication network, different from the CDMA wireless communication network;
receiving authentication information for the communication session from Authentication, Authorization, and Accounting (AAA) equipment in the CDMA wireless communication network over the CDMA wireless communication network; wherein the authentication information comprises at least one of user device authentication information, user authentication information, or network authentication information; and
in response to the registration request, processing the authentication information for the communication session over the CDMA wireless communication network to selectively bypass an associated authentication process in the other wireless communication network to authenticate the communication session in the other wireless communication network, wherein the other wireless communication network comprises one of: a Long Term Evolution (LTE) wireless communication network or a Worldwide Interoperability for Microwave Access (WiMAX) wireless communication network;
processing an activity level of AAA equipment in the other wireless communication network to select the associated authentication process in the other wireless communication network to bypass, wherein the activity level of the AAA equipment in the other network comprises at least one of a registration drop rate, a registration incomplete rate, and a processor utilization level.

9. A method of operating a communication system, the method comprising:
exchanging communications with a user device for a communication session over a CDMA wireless communication network using a CDMA wireless communication mode;
receiving a handover request transferred by the user device for transition of the communication session from the CDMA wireless communication network to another wireless communication network;
in response to the handover request, receiving authentication information for the communication session over the CDMA wireless communication network from Authentication, Authorization, and Accounting (AAA) equipment in the CDMA wireless communication network; wherein the authentication information comprises at least one of user device authentication information, user authentication information, or network authentication information;
processing at least a first portion of the authentication information for the communication session over the CDMA wireless communication network to selectively bypass an associated authentication process in the other wireless communication network to authenticate the communication session in the other wireless communication network, wherein the other wireless communication network comprises one of: a Long Term Evolution (LTE) wireless communication network or a Worldwide Interoperability for Microwave Access (WiMAX) wireless communication network;
processing an activity level of AAA equipment in the other wireless communication network to select the associated authentication process in the other wireless communication network to bypass, wherein the activity level of the AAA equipment in the other wireless network comprises at least one of a registration drop rate, a registration incomplete rate, and a processor utilization level;
and
exchanging further communications with the user device for the communication session over the other wireless communication network using another wireless communication mode.

* * * * *